Aug. 23, 1932.  A. O. BUCKIUS  1,873,540
SHOCK ABSORBING MECHANISM
Filed Aug. 3, 1927  2 Sheets-Sheet 1
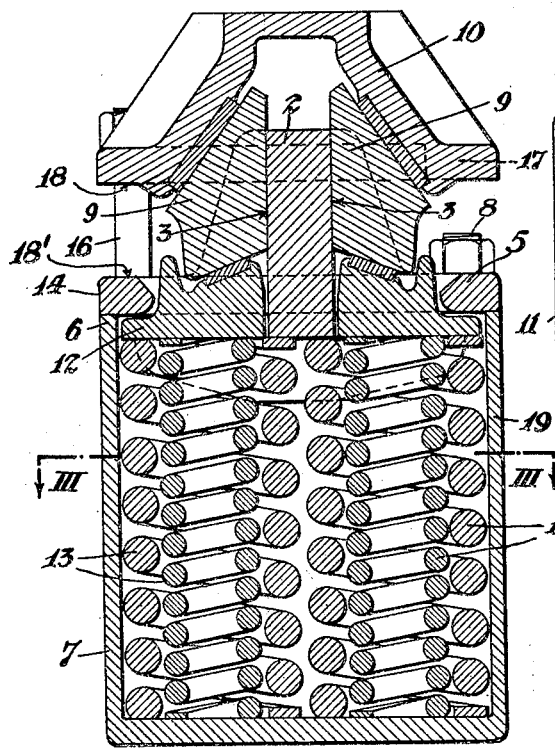
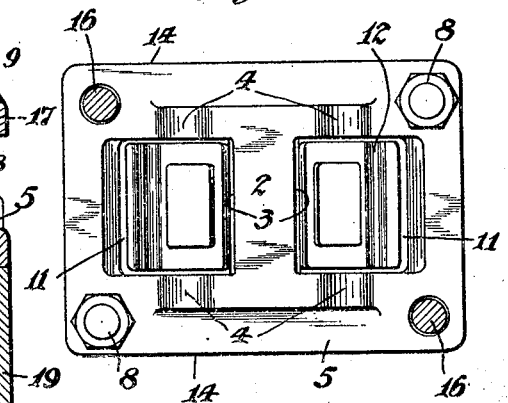
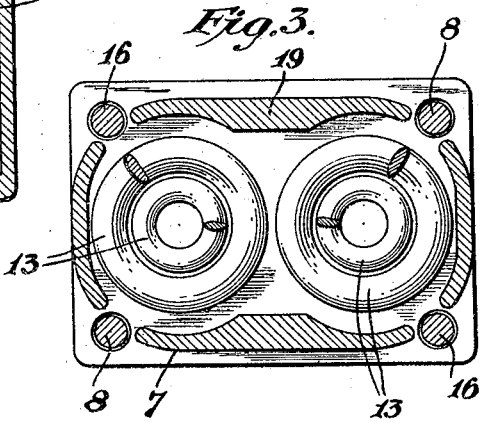
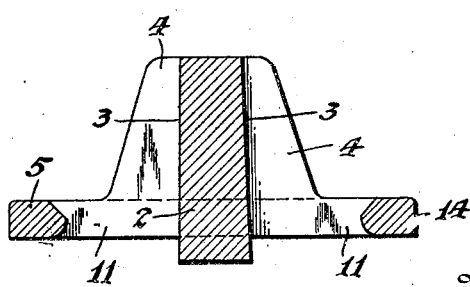
Inventor
Albert O. Buckius
By his Attorney
Clarence O. Kerr Aug. 23, 1932.  A. O. BUCKIUS  1,873,540
SHOCK ABSORBING MECHANISM
Filed Aug. 3, 1927  2 Sheets-Sheet 2
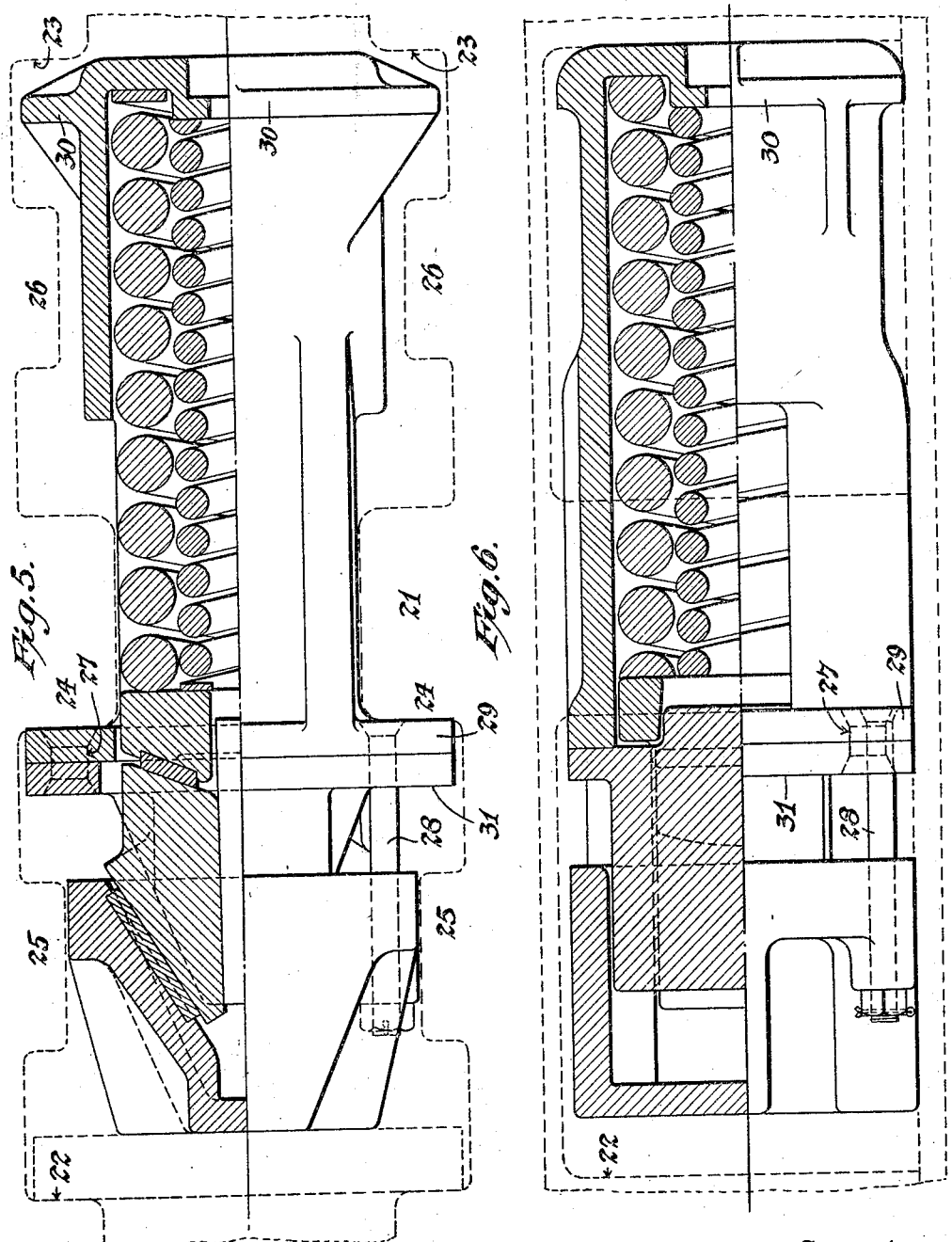
Inventor
Albert O. Buckius
By his Attorney
Clarence D Kerr

UNITED STATES PATENT OFFICE

ALBERT O. BUCKIUS, OF CLEVELAND, OHIO, ASSIGNOR TO NATIONAL MALLEABLE AND STEEL CASTINGS COMPANY, OF CLEVELAND, OHIO, A CORPORATION OF OHIO

SHOCK ABSORBING MECHANISM

Application filed August 3, 1927. Serial No. 210,231.

My invention relates to shock absorbing mechanism of the included friction type, in which the friction shoes are intended to generate friction by being pressed against a central member by wedging means. I have found it desirable in some instances to increase the spring capacity of the gear, and to this end have constructed a spring case, which may be secured at the rear end of an included friction member or shortened form, with the result that I obtain in the same space now required for a heavy-duty gear of the Schmidt type a gear of comparable frictional capacity and an increased spring space without sacrifice of strength either in the parts of the gear or in resistance to over solid blows.

I have found that a central member constructed in the form of an I-bar as described and claimed in my co-pending application, filed of even date herewith, is especially adapted for use with the spring case above referred to. I have also found that such a construction is peculiarly adapted to be applied to existing freight cars which use the old tandem spring construction. My invention also comprises the various features which I shall hereinafter describe and claim.

In the accompanying drawings Fig. 1 is a horizontal section of a gear embodying my invention; Fig. 2 is a front elevation of the gear, but with the wedge and friction shoes removed to show the position of the segment seat and central friction member; Fig. 3 is a section on lines III—III of Fig. 1; Fig. 4 is a detailed section of the central friction member; Fig. 5 is a plan, half in section, showing a modification of my invention with the gear constructed to fit into the usual tandem draft gear pocket of a car; and Fig. 6 is an elevation, half in section, thereof.

Referring more specifically to the drawings, the central friction member is in the form of an I-bar in which the sides of the central or column portion 2 form flat frictional faces 3 arranged at a slight angle to the longitudinal axis of the member. The flanged portions 4 of the bar act as reinforcements to stiffen the bar, and also act as guides for the shoes and wedges relative to the column. The flanged portions 4 merge at their rear ends into a rugged bearing portion or enlarged base portion 5, which bears upon and is secured to the flanged forward open end 6 of the spring case 7, preferably by the bolts 8. On either side of the central column 2 and bearing against the flat faces 3 are the shoes 9, which have a broad bearing upon the frictional faces and at their outer faces are engaged by the wedge follower 10, by which they are pressed against the column 2. Also, the central friction member on either side the column 2 has apertures 11 extending through the base 5 to permit the inner ends of the shoes to be engaged by the segment seat 12. The spring elements 13 are arranged between the rear faces of the segment seat and the inner end of the case, and the central friction member with the segment seat serves to maintain the spring elements 13 under a slight initial compression.

The gear is assembled by first placing the springs 13 in the spring case 7, then placing the segment seat 12 on top of them, and then the central friction member 2 is put in place with its flanges 14 coinciding with the securing flanges 6 on the spring case 7. The spring case and central friction member are held in assembled relation by the securing bolts 8, which pass through aligned holes in the top and bottom flanges of the spring case and in the base of the friction column. Next, the friction shoes 9 are applied against the friction faces 3 of the column, and the wedge 10 is next dropped into position and is secured therein by the retaining rods 16, which also extend through the aligned holes in the spring case and base of the central friction member, arranged alternately between the holes for the bolts 8. The wedge 10 is recessed at 17 to clear the nuts on the bolts 8.

In operation the column 2 and the spring case 7 function as a unit, and the wedge 10 drives the shoes 9 and segment seat 12, rearwardly with respect to the friction column 2. The gear goes solid when the inner surface 18 of the wedge comes into contact with the surface 18' of the base 5. Over-solid blows are thus transmitted directly from the wedge 10 through the base 5 and the walls 19 of the spring case 7, which are sufficiently heavy, as is indicated in Fig. 3, to transmit safely the blows which are met under the present severe service conditions.

One of the difficulties in constructing gears of the included friction type has been to attain a sufficiently high spring capacity. With the construction shown in Figs. 1, 2, 3 and 4, I have been enabled to obtain an increase in spring capacity of substantial extent, by reason of the fact that nearly all of the space taken up by supporting the column in the normal type of included gear is here utilized for spring space.

In the construction of Figs. 5 and 6 I have shown my improved gear in a form particularly adapted for use in a tandem draft gear pocket designed or intended for the reception of a tandem spring draft rigging, a type of draft pocket still to be found on large numbers of freight cars now in use. The sill castings 21 are provided with the usual front and back stops 22 and 23, center stops 24, and front and rear intermediate stops 25 and 26. In this form of gear the spring case and central friction member are secured together by rivets 27, and the rods 28 for securing the wedge in position are attached to the front flanges 29. The spring case is provided with wings 30 for contacting with the rear intermediate stops 26, when the gear goes solid under draft, at which time the forward face of the base 31 of the friction column also comes against the front intermediate stops 25. While in receiving buffing blows the spring case is put under tension, this can never be greater than the maximum spring capacity, in view of the fact that the frictional and over-solid blows are transmitted through the friction column and the flanges 29 directly to the center stops 24. In draft the friction column proper and the spring case function as a unit.

Not only does my improved construction provide room for increased spring capacity, but the short friction column and spring case can be manufactured more cheaply than the full length column, since the spring case can be made out of a cheaper grade of steel, or of malleable iron, instead of having the whole made of a high grade steel. Further, the shorter column is easier to cast, and may be heat treated at much lower cost than the heat treatment of a column of the usual length.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:
1. In frictional shock absorbing mechanism, a longitudinally extending included friction member having a plurality of diverging longitudinally extending friction faces; friction shoes engaging such faces; a wedge member engaging each of said shoes; a pressure transmitting member, the friction member being apertured for the pressure transmitting member; and a spring element entirely to the rear of the friction member arranged to resist the movement of the shoes said pressure transmitting member being interposed between the spring and shoes.

2. In frictional shock absorbing mechanism, a longitudinally extending included friction member having a plurality of diverging longitudinally extending friction faces and a laterally extending base; friction shoes engaging such faces; a wedge engaging said shoes; a spring element intended to resist the inward movement of said shoes and a pressure transmitting member extending through apertures in said base intended to transmit pressure from said spring element to shoes.

3. In frictional shock absorbing mechanism, a longitudinally extending included friction member of I-bar form terminating at its rear end in a broadened base; a spring case secured to the base; friction shoes engaging the sides of the I-bar; spring means within the case to oppose the inward movement of said shoes; a follower wedge engaging said shoes and a pressure transmitting member seated in said case and having a bearing between said spring and said shoes.

ALBERT O. BUCKIUS.